(12) United States Patent
Constantin (10) Patent No.: US 11,767,120 B2
(45) Date of Patent: Sep. 26, 2023

(54) RAISED PASSENGER SEAT ASSEMBLIES

(71) Applicant: Safran Seats USA LLC, Gainesville, TX (US)

(72) Inventor: Jean-Yves Constantin, Montreal (CA)

(73) Assignee: Safran Seats USA LLC, Gainesville, TX (US)

( * ) Notice: Subject to any disclaimer, the term of this patent is extended or adjusted under 35 U.S.C. 154(b) by 565 days.

(21) Appl. No.: 16/489,953

(22) PCT Filed: Mar. 21, 2018

(86) PCT No.: PCT/US2018/023509
§ 371 (c)(1),
(2) Date: Aug. 29, 2019

(87) PCT Pub. No.: WO2018/175545
PCT Pub. Date: Sep. 27, 2018

(65) Prior Publication Data
US 2019/0389583 A1 Dec. 26, 2019

Related U.S. Application Data

(60) Provisional application No. 62/474,295, filed on Mar. 21, 2017.

(51) Int. Cl.
*B64D 11/06* (2006.01)
*B64D 11/00* (2006.01)

(52) U.S. Cl.
CPC ........ *B64D 11/0696* (2013.01); *B64D 11/003* (2013.01); *B64D 11/0606* (2014.12); *B64D 11/0641* (2014.12)

(58) Field of Classification Search
CPC ............ B64D 11/0696; B64D 11/0606; B64D 11/0641
See application file for complete search history.

(56) References Cited

U.S. PATENT DOCUMENTS 7,578,470 B2 * 8/2009 Plant ................. B64D 11/0604
244/118.6
8,118,365 B2 * 2/2012 Henshaw ........... B64D 11/0641
297/354.13
(Continued)

FOREIGN PATENT DOCUMENTS

CN 1628043 A 6/2005
CN 102951087 A 3/2013
(Continued)

OTHER PUBLICATIONS

Europe Patent Application No. 18716767.1, Communication under Rule 71(3) EPC (Intention to Grant), dated Dec. 17, 2020, 6 pages.
Europe Patent Application No. 18716767.1, Decision to Grant a European patent pursuant to Article 97(1) EPC, dated Apr. 22, 2021, 2 pages.
International Patent Application No. PCT/US2018/023509, Search Report and Written Opinion, dated May 29, 2018.
China Patent Application No. 201880020017X, Office Action, dated Sep. 2, 2022.

*Primary Examiner* — Justin M Benedik
(74) *Attorney, Agent, or Firm* — Kilpatrick Townsend & Stockton LLP (57) ABSTRACT

A passenger seat assembly includes a riser attached to an upper surface of a floor of the vehicle, a seat attached to an upper surface of the riser, and at least one shell portion attached to the upper surface of the riser. The riser includes at least one door for accessing an interior volume of the riser. At least a portion of the interior volume of the riser is a luggage storage volume.

17 Claims, 8 Drawing Sheets

(56) References Cited

U.S. PATENT DOCUMENTS

| | | | | |
|---|---|---|---|---|
| 9,938,015 B2* | 4/2018 | Savian | ............... | B64D 11/0636 |
| 2003/0189134 A1* | 10/2003 | Konya | ................... | B64F 1/305 |
| | | | | 244/137.2 |
| 2004/0232283 A1 | 11/2004 | Ferry et al. | | |
| 2009/0243358 A1* | 10/2009 | Henshaw | ........... | B64D 11/0601 |
| | | | | 297/340 |
| 2010/0252680 A1* | 10/2010 | Porter | ..................... | B60R 7/043 |
| | | | | 244/118.6 |
| 2011/0210205 A1* | 9/2011 | Bock | ................. | B64D 11/0636 |
| | | | | 244/118.6 |
| 2013/0038080 A1 | 2/2013 | Tate, Jr. | | |
| 2016/0297530 A1 | 10/2016 | Simeon et al. | | |

FOREIGN PATENT DOCUMENTS

| | | |
|---|---|---|
| DE | 2034103 A1 | 1/1972 |
| DE | 202004008069 U1 | 7/2004 |
| WO | 2003013903 A1 | 2/2003 |
| WO | 2009120308 A2 | 10/2009 |

\* cited by examiner

RAISED PASSENGER SEAT ASSEMBLIES

CROSS REFERENCE TO RELATED APPLICATION

This application is related to and claims the benefit of U.S. Provisional Application No. 62/474,295 ("the '295 application"), filed on Mar. 21, 2017, entitled HIGH FLYING SEAT OVER THE AISLE. The '295 application is hereby incorporated in its entirety by this reference.

FIELD OF THE INVENTION

The field of the invention relates to raised seat arrangements for passenger seats in aircraft or the like.

BACKGROUND

Arrangements of passenger seats, and particularly arrays of passenger seats in vehicles or aircraft, are designed to enhance comfort, aesthetics, and convenience. In addition, passenger seats and arrays thereof ensure passenger safety while maximizing efficiencies related to tasks within the cabin of the vehicle including, for example, storing luggage. In some instances, flight attendants are required to bend down to interact with a passenger. Conventional seats typically include a small area for storage space under the seating area and a larger overhead storage compartment. However, overhead storage may lead to undesirable weight distribution within the vehicle.

As a result, there is a need for new passenger seats and arrays of passenger seats that raise the seating and/or sleeping position of the passenger while creating a luggage storage area under the passenger seat and improving ergonomics for flight attendants. There is also a need to include additional opportunities for enhancing aesthetic features. In addition to improving aesthetics of a passenger seat, removing overhead storage compartments and consolidating all storage to a single area under the passenger seat may lead to a perception of a more open and less cluttered cabin.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger seat assembly for a vehicle comprises: a riser attached to an upper surface of a floor of the vehicle, the riser comprising at least one door for accessing an interior volume of the riser; a seat attached to an upper surface of the riser; and at least one shell portion attached to the upper surface of the riser, wherein at least a portion of the interior volume of the riser is a luggage storage volume.

In some embodiments, the at least one door is disposed on a lateral surface of the riser.

The at least one door, in certain embodiments, comprises a sliding door that slides in a forward/aft direction of the vehicle.

In some embodiments, the at least one door comprises a portion of a drawer that moves rectilinearly with respect to the riser.

In certain embodiments, the at least one door comprises a first door disposed on a lateral surface of the riser and a second door located on an upper surface of the riser.

In some embodiments, the at least one shell portion comprises a forward shell portion, a rear shell portion, and a divider panel.

In certain embodiments, a height of the riser is more than 9".

The seat, in certain embodiments, comprises a sitting configuration and a bed configuration.

The passenger seat assembly, in some embodiments, further comprises at least one movable shade including a stowed configuration and at least one deployed configuration.

In some embodiments, in the stowed configuration, the at least one movable shade is retracted above a ceiling of the vehicle.

In certain embodiments, in one of the at least one deployed configuration, the at least one movable shade extends from a ceiling of the vehicle and approximately reaches the at least one shell portion.

According to certain embodiments of the present invention, a passenger seat assembly for a vehicle comprises: a riser attached to an upper surface of a floor of the vehicle; a seat attached to an upper surface of the riser; at least one shell portion attached to the upper surface of the riser; and at least one movable shade including a stowed configuration and at least one deployed configuration.

In certain embodiments, in the stowed configuration, the at least one movable shade is retracted above a ceiling of the vehicle.

In some embodiments, in one of the at least one deployed configuration, the at least one movable shade extends from a ceiling of the vehicle and approximately reaches the at least one shell portion.

In certain embodiments, the at least one shell portion comprises a forward shell portion, a rear shell portion, and a divider panel; the at least one movable shade comprises a forward shade, a rear shade, and a center shade; and in one of the at least one deployed configuration, (i) the forward shade extends from a ceiling of the vehicle and approximately reaches the forward shell portion, (ii) the rear shade extends from the ceiling of the vehicle and approximately reaches the rear shell portion, and (iii) the center shade extends from the ceiling of the vehicle and approximately reaches the divider panel.

In some embodiments, a height of the riser is more than 9".

The riser, in some embodiments, comprises at least one door for accessing an interior volume of the riser and at least a portion of the interior volume of the riser is a luggage storage volume.

In certain embodiments, the at least one door is disposed on a lateral surface of the riser.

The at least one door, in certain embodiments, comprises a sliding door that slides in a forward/aft direction of the vehicle.

In some embodiments, the at least one door comprises a first door disposed on a lateral surface of the riser and a second door located on an upper surface of the riser.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

FIGS. 1-8 illustrate embodiments of passenger seat assemblies 100 for vehicles such as an aircraft where each passenger seat assembly 100 includes a riser 101, a luggage compartment door 102, a forward shell portion 103, a rear shell portion 104, a divider panel 105, and a seat 140. In some embodiments, the passenger seat assembly 100 may also include shades, such as a forward shade 203, a rear shade 204, and/or a center shade 205.

Figure 4:
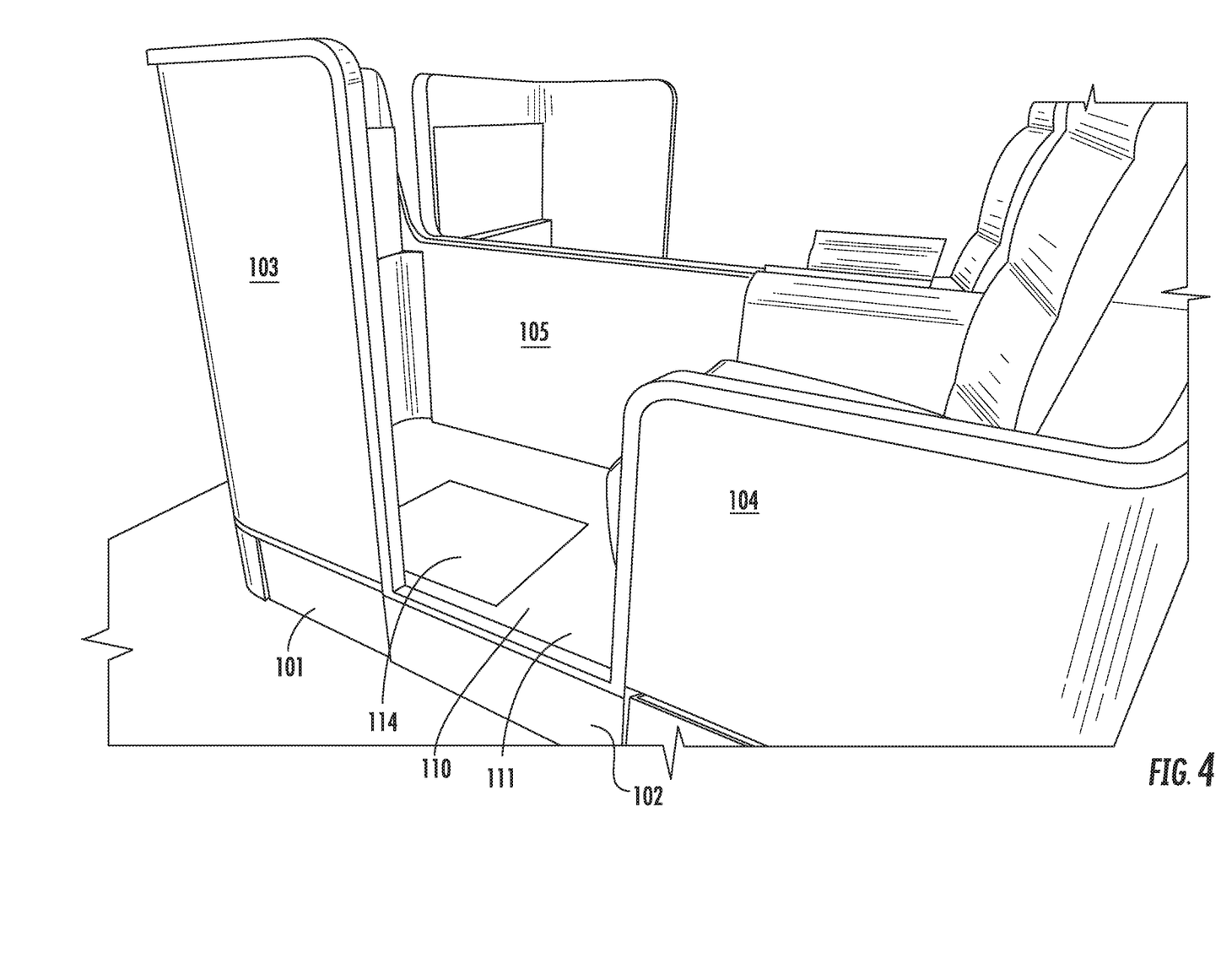
FIG. 4 is a rear perspective view of the passenger seat assembly of FIG. 1.
Figure 6:
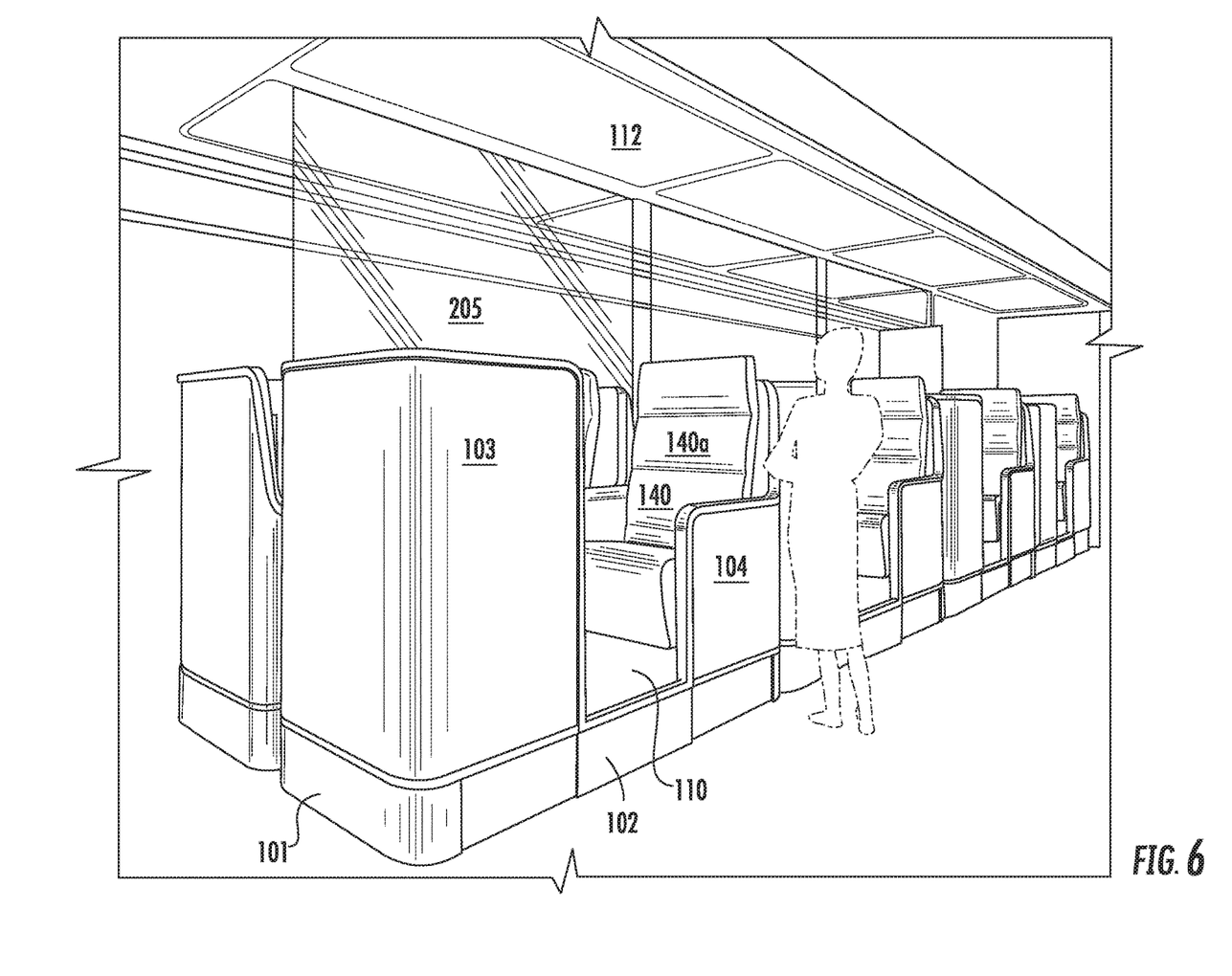
FIG. 6 is a front perspective view of the passenger seat assembly of FIG. 1.

In some embodiments, the riser 101 is a platform that raises the seat 140 and the seat shell components (103, 104, 105, etc.) such that a passenger steps up from the floor of the cabin to the floor 111 of the passenger seat assembly 100 (see FIG. 4). In addition to raising the floor 111 of the passenger seat assembly 100, the riser 101 may provide internal storage for luggage 10 thus eliminating the need for overhead storage compartments. The riser 101 may be designed to ensure compatibility with typical luggage sizes, such as, for example, a standard size of 22"×14"×9". In some embodiments, the height of the is more than 9" to ensure standard luggage will fit through the openings and store within the riser 101. As shown in FIG. 6, due to the raised position of the seat 140, a typical flight attendant's head is closer to the upper body of a passenger, which facilitates easier communication.

Figure 1:
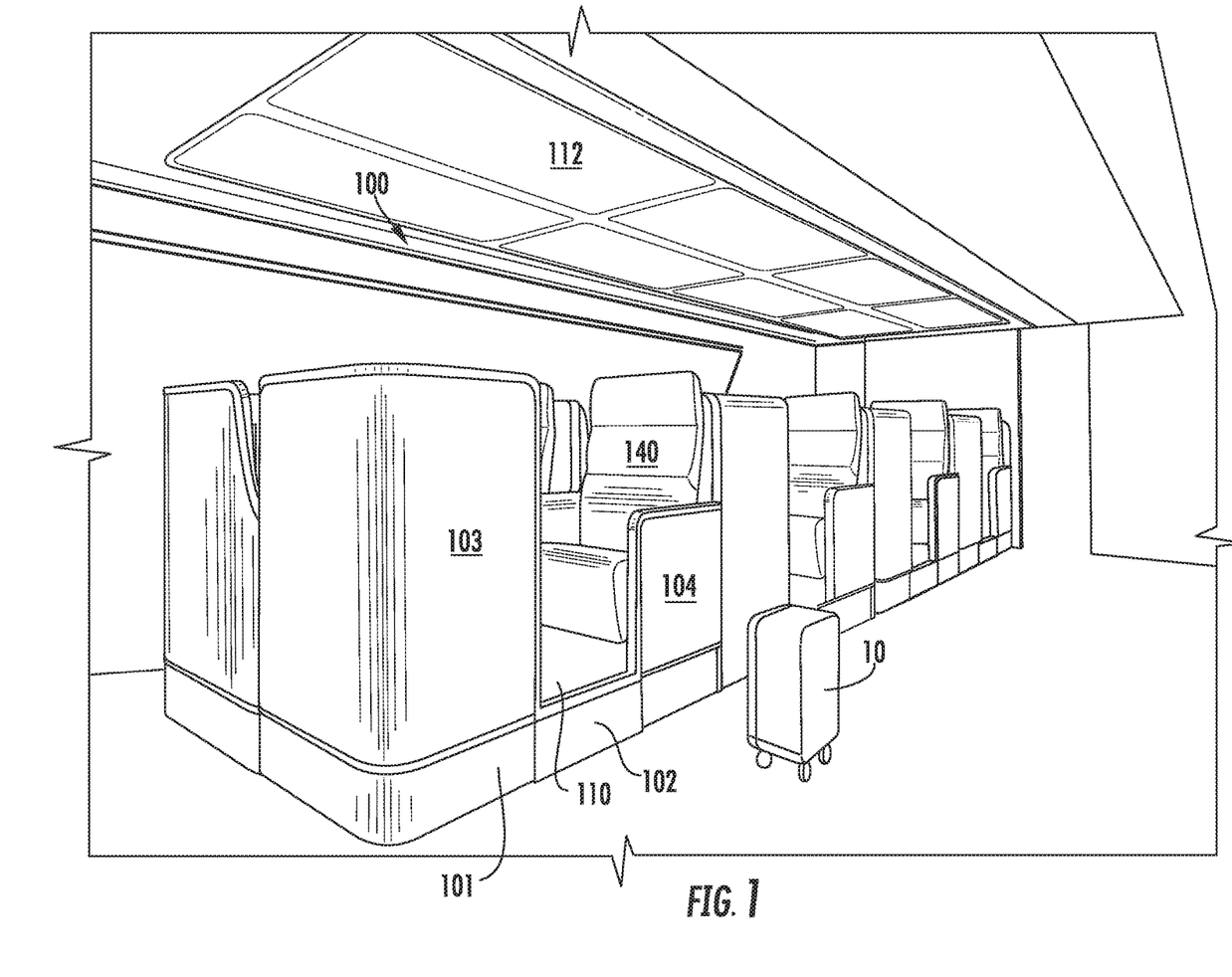
FIG. 1 is a front perspective view of a passenger seat assembly according to certain embodiments of the present invention.

The passenger seat assembly 100 illustrated in FIG. 1 includes an opening 110 between the forward shell portion 103 and the rear shell portion 104 to allow access to the seat 140. Although the riser 101 is illustrated as covering the full area of the passenger seat assembly 100 (i.e., defined by the extremities of the forward shell portion 103, the rear shell portion 104, and the divider panel 105), the riser 101 may cover a smaller area in some embodiments. In certain embodiments, some or all of the interior volume of the riser 101 is available for storage. The luggage compartment door 102 for accessing the interior of the riser 101 may be on a lateral surface of the riser 101 facing an aisle of the cabin and may be located under the opening 110 (as shown in FIG. 1) such that the luggage compartment door 102 is approximately the same width as the opening 110 and is the full height of the riser 101. In other embodiments, the luggage compartment door 102 is located at a different portion of the riser 101 (e.g., under the forward shell portion 103) and/or is a different size (e.g., wider or narrower than the opening 110).

Figure 2:
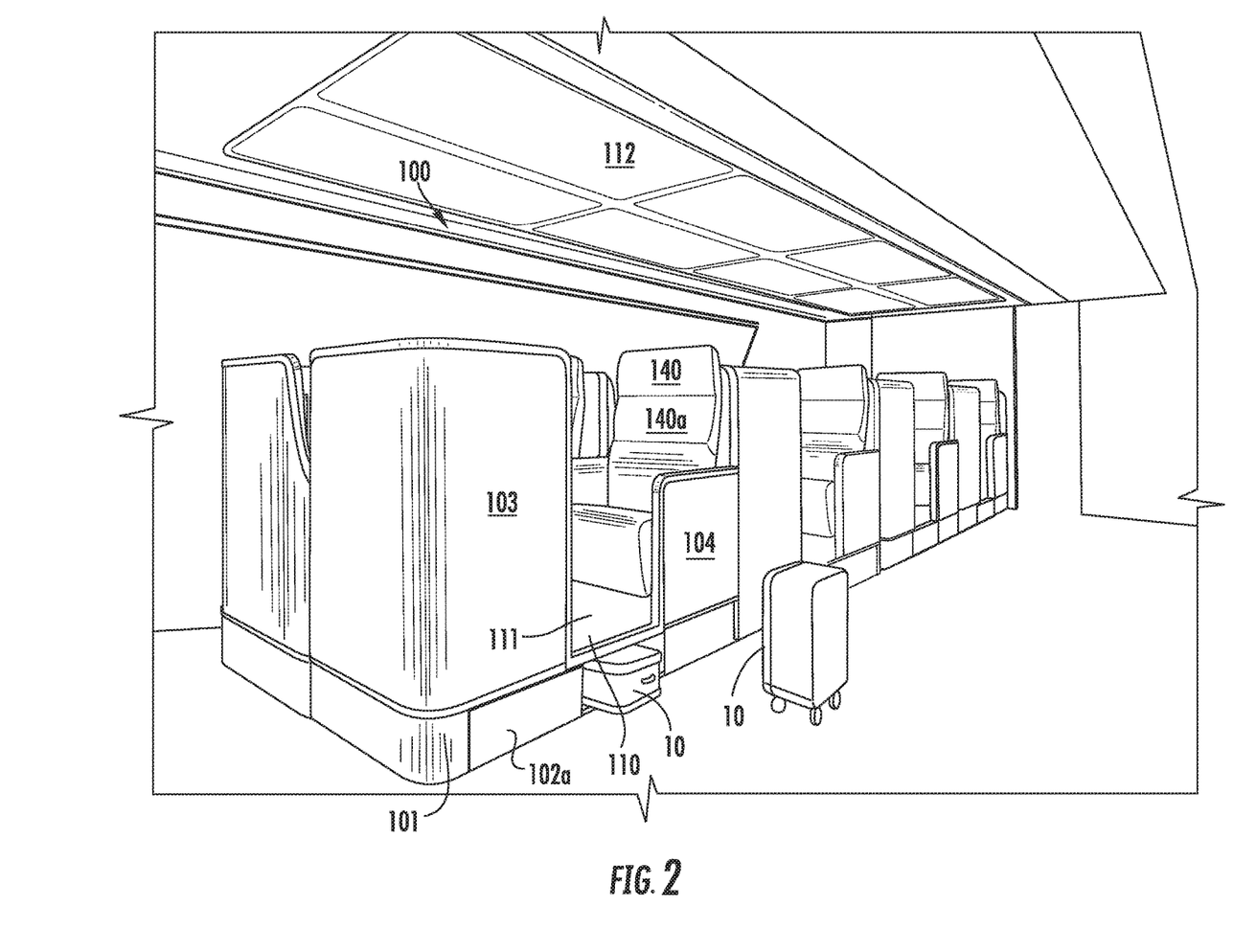
FIG. 2 is a front perspective view of the passenger seat assembly of FIG. 1.

As shown in FIG. 2, in some embodiments, the luggage compartment door 102 is a sliding door 102a that slides in the forward/aft direction of the aircraft to reveal an opening to the interior of the riser 101 for storing luggage 10. The sliding door 102a is illustrated sliding forward toward the forward shell portion 103; however, the sliding door 102a may be capable of sliding aft or may be capable sliding both forward and aft. The sliding door 102a and the opening exposed after moving the sliding door 102a are each approximately equal in size (i.e., width) to the opening 110. However, the opening and/or the sliding door 102a may be larger or smaller than the opening 110. In other embodiments, the luggage compartment door 102 may include a hinge such that the luggage compartment door 102 may pivot relative to the passenger seat assembly 100. The luggage compartment door 102 may be capable of pivoting into the interior of the riser 101 or pivoting away from the interior of the riser 101 (or both) and may include at least one of a vertical pivot axis (i.e., pivot toward another seat) and a horizontal pivot axis (i.e., pivot toward or away from the floor).

Figure 3:
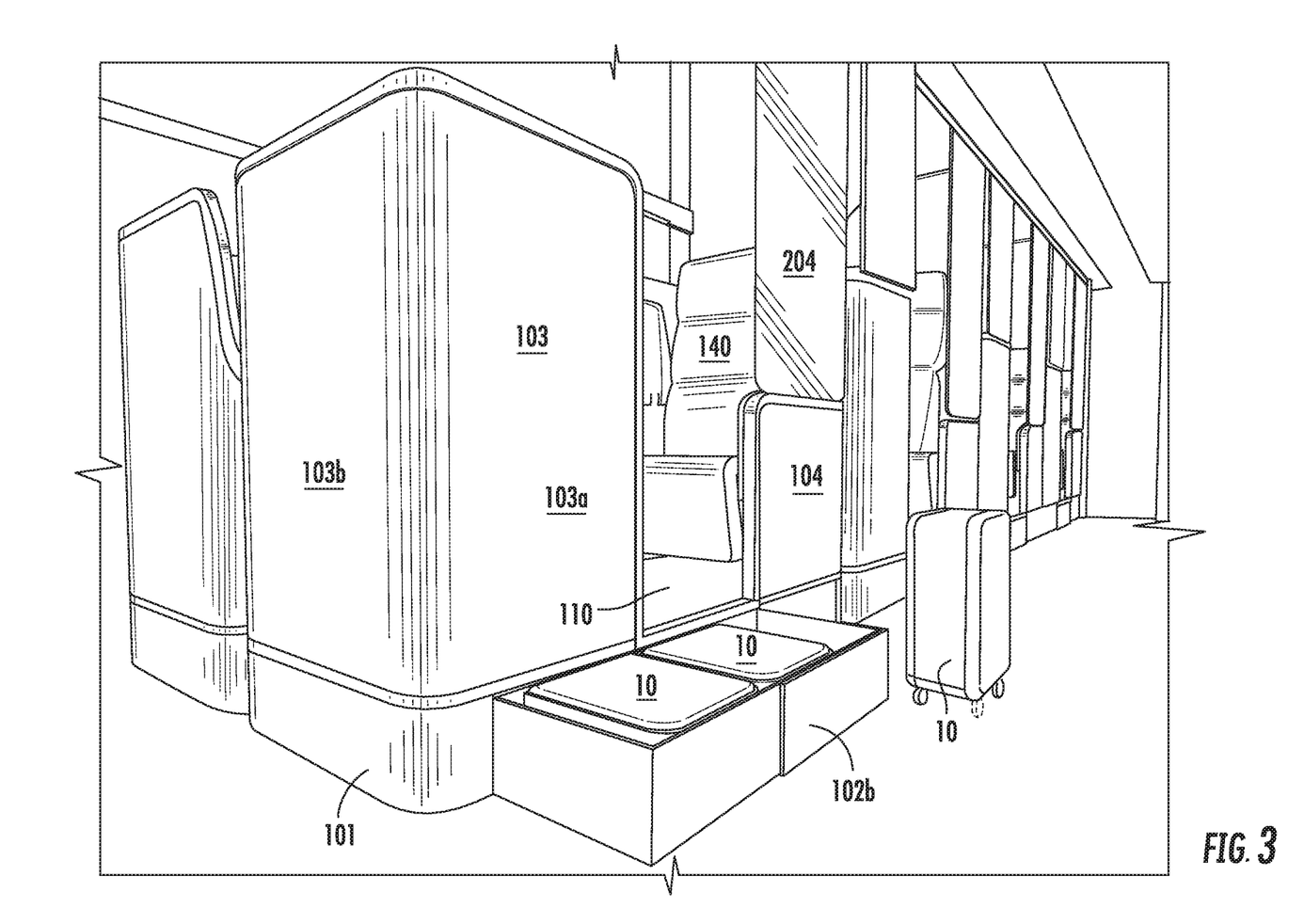
FIG. 3 is a front perspective view of the passenger seat assembly of FIG. 1.

The luggage compartment door 102, as shown in FIG. 3, may be at least a portion of a drawer face (and/or include a handle/grip for a drawer) such that the drawer 102b moves rectilinearly from the riser 101 to reveal a moveable storage drawer capable of stowing in the riser 101. The drawer 102b illustrated in FIG. 3 has a width that corresponds to the width of the opening 110 and a portion of the forward shell portion 103. In some embodiments, the drawer 102b corresponds to the width of the opening 110 and the full width of the forward shell portion 103 (i.e., the drawer 102b may extend to the corner at the interface between the lateral surface 103a and the forward surface 103b of the forward shell portion 103). The drawer 102b may also extend into a portion of the riser 101 under the rear shell portion 104.

As shown in FIG. 4, in addition to or in lieu of the luggage compartment door 102, the passenger seat assembly 100 may include an additional door, such as a hatch 114 that is a removable and/or hinged panel to access the interior of the riser 101 where the hatch 114 is a portion of the floor 111 of the passenger seat assembly 100. The hatch 114 may provide access to all or a portion of the interior of the riser 101 allowing access to, for example, carryon items. The hatch 114 is compatible with the sliding door 102a, the drawer 102b, a combination thereof, or any other appropriate alternative for accessing the interior of the riser 101.

Figure 5:
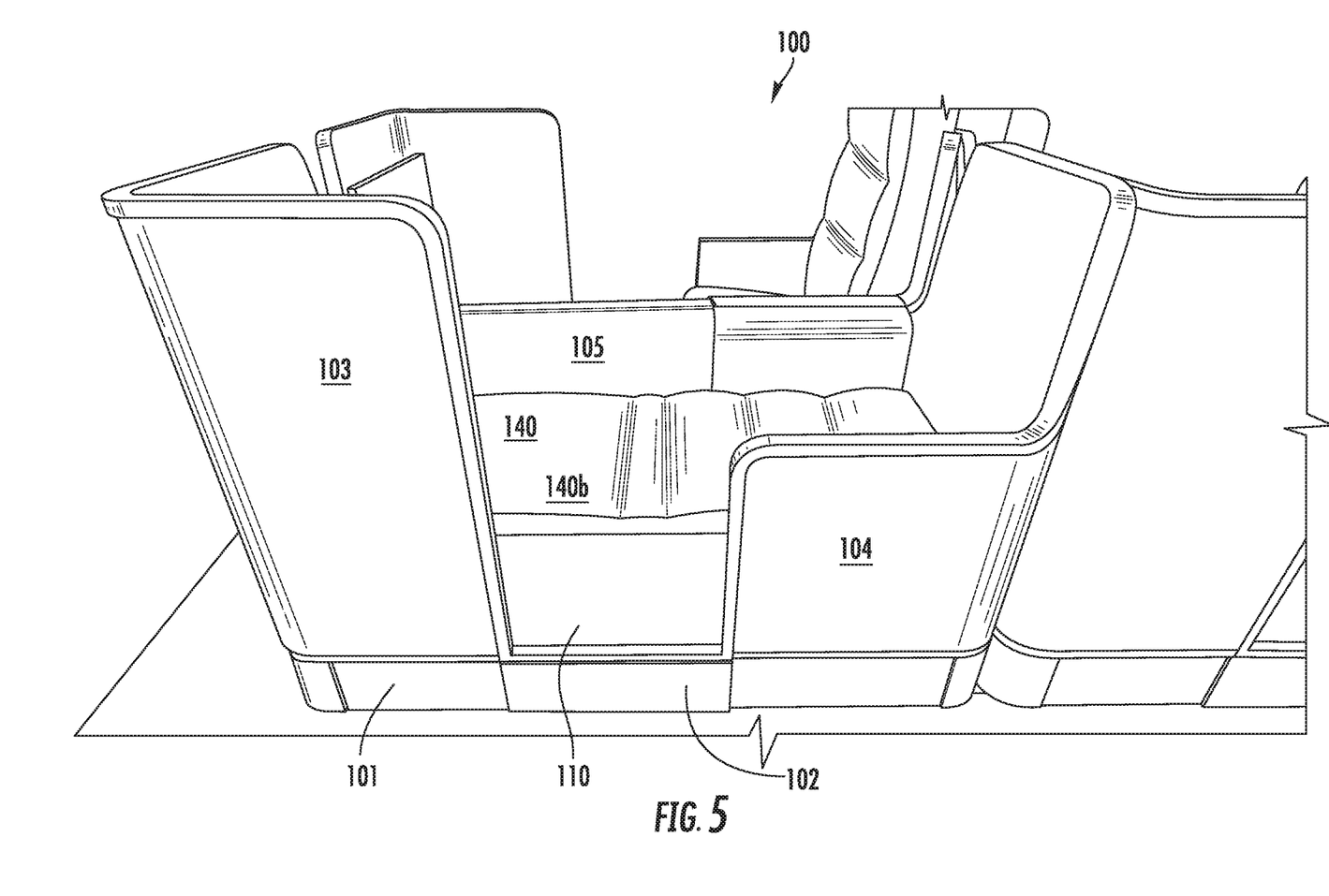
FIG. 5 is a side perspective view of the passenger seat assembly of FIG. 1.

In some embodiments, the seat 140 includes a sitting configuration 140a (e.g., see FIGS. 2 and 6) and a bed configuration 140b (e.g., see FIG. 5). The seat 140 (in one or both of the sitting configuration 140a and the bed configuration 140b) may include cushions and/or a mattress that includes at least one of an air mattress, a water mattress, a nano-foam mattress. The seat 140 may be adjustable for firmness, thickness, or other appropriate attributes. The seat 140 may also be selectively inflatable with air, water, or other materials (such as microbeads). In some embodiments, the seat 140 may deflate automatically for takeoff and/or landing conditions. The passenger seat assembly 100 may include a pump and/or a tank for storing air, liquid, or other substances for inflating/deflating the seat 140. In some embodiments, the pump and/or tank is located in the riser 101.

Figure 7:
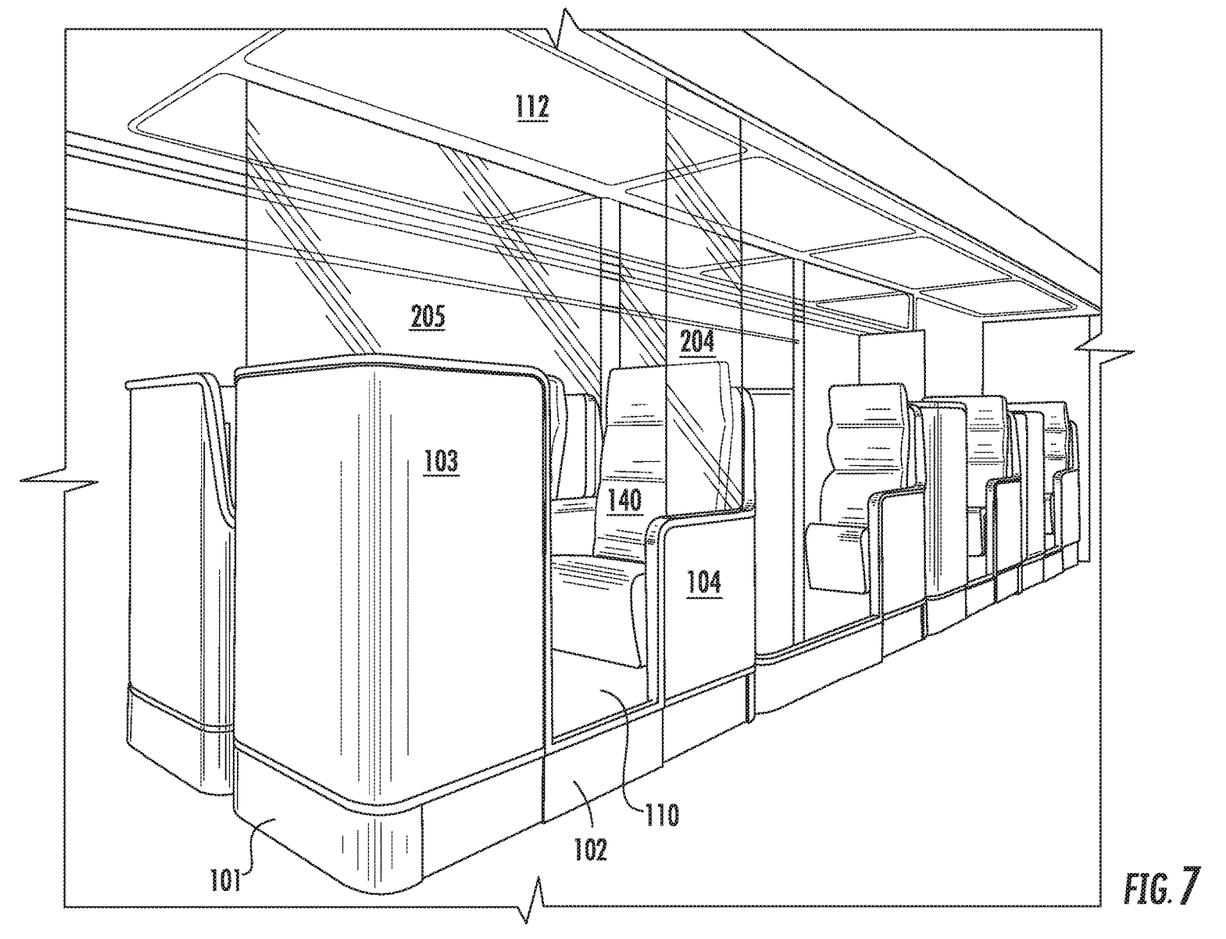
FIG. 7 is a front perspective view of the passenger seat assembly of FIG. 1.
Figure 8:
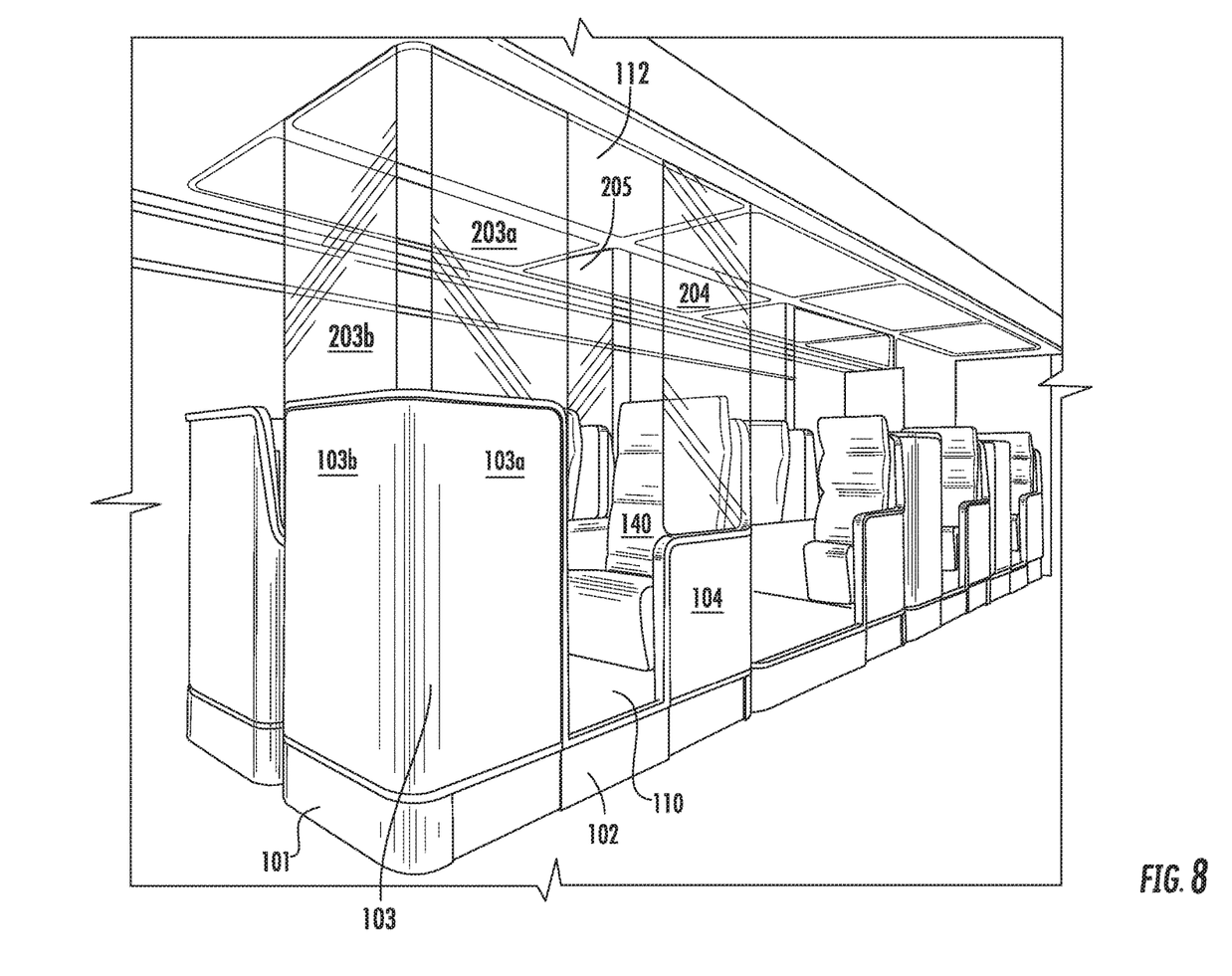
FIG. 8 is a front perspective view of the passenger seat assembly of FIG. 1.

As shown in FIGS. 6-8, the passenger seat assembly 100 may include at least one movable shade that is translucent, opaque, or a combination thereof to provide privacy for the passenger in the passenger seat assembly 100. For example, the passenger seat assembly 100 may include a forward shade 203 (which may be separated into a lateral shade 203*a* and a forward shade 203*b*), a rear shade 204, and/or a center shade 205. The shades may include various patterns to suit aesthetic tastes and may be replaceable to adapt to a desired decorum for a particular cabin environment or a particular passenger seat assembly 100. In some embodiments, each shade may have a stowed configuration where the shade is retracted within the ceiling 112 of the cabin (i.e., the shade is not visible) as shown in FIGS. 1 and 2. The shades may also include at least one deployed configuration. The shades may be independently controllable and, in some embodiments, can be controlled to extend/retract collectively. The shades may be mechanically and/or electrically controlled and moved between the stowed and deployed configurations. In some embodiments, the passenger has controls for each of the shades for the passenger seat assembly 100. In addition, flight attendants may have controls for the shades. The shades may also retract to the stowed configuration automatically for takeoff and/or landing conditions.

The rear shade 204, as shown in FIG. 7, may include a deployed configuration where the rear shade 204 extends from the ceiling 112 of the cabin and approximately reaches the rear shell portion 104. In some embodiments, the rear shade 204 may include additional deployed configurations such that the rear shade 204 extends from the ceiling 112 of the cabin but does not reach the rear shell portion 104. In other words, the rear shade 204 may be partially deployed to reduce glare from other portions of the cabin but still allow the passenger to see over the rear shell portion 104 and/or communicate with others (such as flight attendants). Similarly, the center shade 205 may extend from the ceiling 112 of the cabin and approximately reach the divider panel 105 in a deployed configuration. The center shade 205 may also include partially deployed configurations such that the center shade 205 extends from the ceiling 112 of the cabin but does not reach the divider panel 105.

For the forward shell portion 103, as shown in FIG. 8, the forward shade 203 may include a deployed configuration where the forward shade 203 extends from the ceiling 112 of the cabin and approximately reaches the forward shell portion 103. The forward shade 203 may also include partially deployed configurations such that the forward shade 203 extends from the ceiling 112 of the cabin but does not reach the forward shell portion 103. As shown in FIG. 8, the forward shade 203 may include a lateral shade 203*a* and a forward shade 203*b* that correspond to the lateral surface 103*a* and the forward surface 103*b* of the forward shell portion 103, respectively.

The components of the passenger seat assembly 100 may be formed of materials including, but not limited to, aluminum, steel, titanium, carbon composite, graphite composite, polyester, nylon, plastic, thermoplastic, cotton, synthetic fabrics, other fabric materials, stainless steel, other plastic or polymer materials, other metallic materials, other composite materials, or other similar materials. Moreover, the components of the passenger seat assembly 100 may be attached to one another via suitable fasteners, which include, but are not limited to, screws, bolts, rivets or other mechanical or chemical fasteners.

In the following, further examples are described to facilitate understanding of aspects of the invention:

Example A. A passenger seat assembly for a vehicle comprising:
a riser attached to an upper surface of a floor of the vehicle, the riser comprising at least one door for accessing an interior volume of the riser;
a seat attached to an upper surface of the riser; and
at least one shell portion attached to the upper surface of the riser,
wherein at least a portion of the interior volume of the riser is a luggage storage volume.

Example B. The passenger seat assembly of Example A or any of the preceding or subsequent examples, wherein the at least one door is disposed on a lateral surface of the riser.

Example C. The passenger seat assembly of Example B or any of the preceding or subsequent examples, wherein the at least one door comprises a sliding door that slides in a forward/aft direction of the vehicle.

Example D. The passenger seat assembly of Example B or any of the preceding or subsequent examples, wherein the at least one door comprises a portion of a drawer that moves rectilinearly with respect to the riser.

Example E. The passenger seat assembly of Example A or any of the preceding or subsequent examples, wherein the at least one door comprises a first door disposed on a lateral surface of the riser and a second door located on an upper surface of the riser.

Example F. The passenger seat assembly of Example A or any of the preceding or subsequent examples, wherein the at least one shell portion comprises a forward shell portion, a rear shell portion, and a divider panel.

Example G. The passenger seat assembly of Example A or any of the preceding or subsequent examples, wherein a height of the riser is more than 9".

Example H. The passenger seat assembly of Example A or any of the preceding or subsequent examples, wherein the seat comprises a sifting configuration and a bed configuration.

Example I. The passenger seat assembly of Example A or any of the preceding or subsequent examples, further comprising at least one movable shade including a stowed configuration and at least one deployed configuration.

Example J. The passenger seat assembly of Example I or any of the preceding or subsequent examples, wherein, in the stowed configuration, the at least one movable shade is retracted above a ceiling of the vehicle.

Example K. The passenger seat assembly of Example I or any of the preceding or subsequent examples, wherein, in one of the at least one deployed configuration, the at least one movable shade extends from a ceiling of the vehicle and approximately reaches the at least one shell portion.

Example L. A passenger seat assembly for a vehicle comprising:
a riser attached to an upper surface of a floor of the vehicle;
a seat attached to an upper surface of the riser;

at least one shell portion attached to the upper surface of the riser; and at least one movable shade including a stowed configuration and at least one deployed configuration.

Example M. The passenger seat assembly of Example L or any of the preceding or subsequent examples, wherein, in the stowed configuration, the at least one movable shade is retracted above a ceiling of the vehicle.

Example N. The passenger seat assembly of Example L or any of the preceding or subsequent examples, wherein, in one of the at least one deployed configuration, the at least one movable shade extends from a ceiling of the vehicle and approximately reaches the at least one shell portion.

Example O. The passenger seat assembly of Example L or any of the preceding or subsequent examples, wherein:

the at least one shell portion comprises a forward shell portion, a rear shell portion, and a divider panel;

the at least one movable shade comprises a forward shade, a rear shade, and a center shade; and in one of the at least one deployed configuration, (i) the forward shade extends from a ceiling of the vehicle and approximately reaches the forward shell portion, (ii) the rear shade extends from the ceiling of the vehicle and approximately reaches the rear shell portion, and (iii) the center shade extends from the ceiling of the vehicle and approximately reaches the divider panel.

Example P. The passenger seat assembly of Example L or any of the preceding or subsequent examples, wherein a height of the riser is more than 9".

Example Q. The passenger seat assembly of Example L or any of the preceding or subsequent examples, wherein the riser comprises at least one door for accessing an interior volume of the riser and at least a portion of the interior volume of the riser is a luggage storage volume.

Example R. The passenger seat assembly of Example Q or any of the preceding or subsequent examples, wherein the at least one door is disposed on a lateral surface of the riser.

Example S. The passenger seat assembly of Example Q or any of the preceding or subsequent examples, wherein the at least one door comprises a sliding door that slides in a forward/aft direction of the vehicle.

Example T. The passenger seat assembly of Example Q or any of the preceding or subsequent examples, wherein the at least one door comprises a first door disposed on a lateral surface of the riser and a second door located on an upper surface of the riser.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A passenger seat assembly for a vehicle comprising:
a platform attached to an upper surface of a floor of the vehicle, the platform includes an interior volume, an upper surface, a width-wise surface, and a length-wise surface defining an exterior profile of the platform;
a seat on, and attached to, the upper surface of the exterior profile; and
a forward shell portion positioned at the upper surface of the platform;
a rear shell portion positioned at the upper surface of the platform and opposite the forward shell portion;
a divider panel positioned at the upper surface of the platform and extending between the forward shell portion and the rear shell portion;
wherein the platform further includes at least one door for accessing an interior volume of the platform,
wherein at least a portion of the interior volume of the platform is a luggage storage volume, and
wherein the seat, the forward shell portion, the rear shell portion, and the divider panel each include lower ends that are raised off the floor of the vehicle by the exterior profile.

2. The passenger seat assembly of claim 1, wherein the at least one door is disposed on a lateral surface of the platform.

3. The passenger seat assembly of claim 2, wherein the at least one door comprises a sliding door that is configured to slide in a forward/aft direction of the vehicle.

4. The passenger seat assembly of claim 2, wherein the at least one door comprises a portion of a drawer that is configured to move rectilinearly with respect to the platform.

5. The passenger seat assembly of claim 2, wherein the at least one door comprises a first door disposed on a lateral surface of the platform and a second door located on the upper surface of the platform.

6. The passenger seat assembly of claim 1, wherein the seat is configured to move between a sitting configuration and a bed configuration.

7. The passenger seat assembly of claim 1, further comprising at least one movable shade movable between a stowed configuration and at least one deployed configuration.

8. The passenger seat assembly of claim 7, wherein, in the stowed configuration, the at least one movable shade is retracted above a ceiling of the vehicle.

9. The passenger seat assembly of claim 7, wherein the at least one deployed configuration comprises a plurality of deployed configurations, wherein, in one deployed configuration of the plurality of deployed configurations, the at least one movable shade extends from a ceiling of the vehicle to at least one of the forward shell portion, the rear shell portion, or the divider panel.

10. The passenger seat assembly of claim 1, wherein the platform defines a maximum length of the passenger seat assembly.

11. A passenger seat assembly for a vehicle comprising:
a platform attached to an upper surface of a floor of the vehicle, wherein the platform includes an interior volume an upper surface, a width-wise surface, and a length-wise surface defining an exterior volume of the platform;
a seat on, and attached to, the upper surface of the exterior volume; and
a forward shell portion positioned at the upper surface of the platform;
a rear shell portion positioned at the upper surface of the platform and opposite the forward shell portion;

a divider panel positioned at the upper surface of the platform and extending between the forward shell portion and the rear shell portion; and wherein the platform further includes at least one door for accessing an interior volume of the platform, wherein at least a portion of the interior volume of the platform is a luggage storage volume, and wherein the seat, the forward shell portion, the rear shell portion, and the divider panel each include lower ends that are raised off the floor of the vehicle by the exterior volume.

12. The passenger seat assembly of claim 11, wherein the at least one door is disposed on a lateral surface of the platform.

13. The passenger seat assembly of claim 11, wherein the at least one door comprises a sliding door that is configured to slide in a forward/aft direction of the vehicle.

14. The passenger seat assembly of claim 11, wherein the at least one door comprises a first door disposed on a lateral surface of the platform and a second door located on the upper surface of the platform.

15. The passenger seat assembly of claim 11,
further comprising at least one movable shade movable between a stowed configuration and at least one deployed configuration, and wherein, in the stowed configuration, the at least one movable shade is retracted above a ceiling of the vehicle.

16. The passenger seat assembly of claim 15 wherein the at least one deployed configuration comprises a plurality of deployed configurations, wherein, in at least one deployed configuration of the plurality of deployed configurations, the at least one movable shade extends from a ceiling of the vehicle to at least one of the forward shell portion, the rear shell portion, or the divider panel.

17. The passenger seat assembly of claim 15, wherein:
the at least one movable shade comprises a forward shade, a rear shade, and a center shade; and in the at least one deployed configuration, (i) the forward shade extends from a ceiling of the vehicle and approximately reaches the forward shell portion, (ii) the rear shade extends from the ceiling of the vehicle and approximately reaches the rear shell portion, and (iii) the center shade extends from the ceiling of the vehicle to the divider panel.

\* \* \* \* \*